United States Patent
Wang et al.

(10) Patent No.: US 12,219,586 B2
(45) Date of Patent: Feb. 4, 2025

(54) METHOD AND APPARATUS FOR SUPPORTING TRANSMISSION ADAPTATION

(71) Applicant: Telefonaktiebolaget LM Ericsson (publ), Stockholm (SE)

(72) Inventors: Min Wang, Luleå (SE); Jinhua Liu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 375 days.

(21) Appl. No.: 17/621,468

(22) PCT Filed: Apr. 27, 2020

(86) PCT No.: PCT/CN2020/087294
§ 371 (c)(1),
(2) Date: Dec. 21, 2021

(87) PCT Pub. No.: WO2020/259063
PCT Pub. Date: Dec. 30, 2020

(65) Prior Publication Data
US 2022/0353877 A1    Nov. 3, 2022

(30) Foreign Application Priority Data
Jun. 25, 2019  (WO) ............... PCT/CN2019/092828

(51) Int. Cl.
*H04W 72/50*     (2023.01)
*H04W 72/54*     (2023.01)

(52) U.S. Cl.
CPC ................. *H04W 72/54* (2023.01)

(58) Field of Classification Search
CPC ... H04L 1/1614; H04L 1/1819; H04L 1/1854; H04L 1/188; H04L 1/1896; H04W 72/23; H04W 72/54; H04W 74/0808
See application file for complete search history.

(56) References Cited

U.S. PATENT DOCUMENTS 10,972,223 B2 *   4/2021   Zhang ............... H04L 1/1822
11,153,886 B2 *  10/2021   Zhang ............... H04W 72/542
(Continued)

FOREIGN PATENT DOCUMENTS

WO   2008114134 A2   9/2008
WO   2018130183 A1   7/2018

OTHER PUBLICATIONS

Huawei, HiSilicon, Transmission with configured grant in NR unlicensed band, 3GPP TSG RAN WG1 Meeting #93, R1-1805922, May 21-25, 2018.*

(Continued)

Primary Examiner — Frank Duong
(74) Attorney, Agent, or Firm — Murphy, Bilak & Homiller, PLLC

(57) ABSTRACT

Various embodiments of the present disclosure provide a method for supporting transmission adaptation. The method which may be performed by a terminal device comprises receiving, from a network node, signaling information indicating an adjustment amount of a parameter for a transmission from the terminal device to the network node. The transmission is based at least in part on a semi-static scheduling configuration for the terminal device by the network node. According to the embodiments of the present disclosure, the transmission adaptation for uplink transmission with semi-static scheduling configuration can be implemented flexibly and efficiently.

20 Claims, 10 Drawing Sheets

(56) References Cited

U.S. PATENT DOCUMENTS

| | | | |
|---|---|---|---|
| 11,399,392 B2* | 7/2022 | Li | H04W 74/0808 |
| 11,678,334 B2* | 6/2023 | Vaidya | H04W 72/21 370/329 |
| 2019/0342911 A1* | 11/2019 | Talarico | H04L 5/0098 |
| 2020/0008229 A1* | 1/2020 | Li | H04L 1/0027 |
| 2022/0116152 A1* | 4/2022 | Iyer | H04L 1/188 |

OTHER PUBLICATIONS

Ericsson, On support for deterministic periodic traffic with configured grants, 3GPP TSG-RAN WG2 #104 Tdoc, R2-1817174, 6 pages, Nov. 12-16, 2018.*

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

Nokia, et al., "On support of UL transmission with configured grants in NR-U", 3GPP TSG RAN WG1 Meeting #93, R1-1806111, Busan, Korea, May 21-25, 2018, 1-4.

Qualcomm Incorporated, "Enhancement to configured grants in NR unlicensed", 3GPP TSG RAN WG1 Meeting #93, R1-1807392, Busan, Korea, May 21-May 25, 2018, 1-6.

* cited by examiner

METHOD AND APPARATUS FOR SUPPORTING TRANSMISSION ADAPTATION

FIELD OF THE INVENTION

The present disclosure generally relates to communication networks, and more specifically, to transmission adaptation in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate. In addition to the licensed band, a wireless communication network can also support communications on the unlicensed band to increase network capacity. In order to meet data transmission requirements, the wireless communication network can perform a scheduling procedure to allocate radio resource and configure transmissions for a terminal device such as user equipment (UE) according to a scheduling request (SR) and link quality of the terminal device. Considering the variability of the network environment and channel conditions, it is desirable to achieve transmission adaptation to enhance the network performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as 5G/NR may be able to support flexible channel sharing. For different radio devices operated in the unlicensed band, carrier sensing is used for acquiring a channel in the shared spectrum. In order to speed up the channel acquiring, autonomous uplink (AUL) transmission based on configured scheduling may be introduced for the unlicensed operation. For example, a UE can acquire a channel for uplink (UL) transmission using a configured grant (CG) after a listen-before-talk (LBT) procedure succeeds. In the case that the initial transmission using the CG is failed, the UE can perform automatic retransmission using another CG without additional LBT procedure. In order for link adaptation, it may be needed to update a transmission pattern (e.g., modulation and coding scheme (MCS), transmission block size (TBS), etc.) according to variation of the UE's link condition. However, the update of the transmission pattern may increase signaling overhead with additional communication latency. Therefore, it may be desirable to implement transmission adaptation in a more efficient way.

Various embodiments of the present disclosure propose a solution for supporting transmission adaptation in a communication network, which can adjust, by indicating the amount of change in a transmission parameter value, a transmission pattern for UL transmission using a CG, so that the transmission adaptation for non-dynamic or semi-static scheduling can be achieved without increasing signaling overhead significantly. In addition, the proposed solution can enable the transmission parameter adjustment to be confirmed in a flexible and efficient manner, so as to enhance the transmission performance and ensure the latency requirement.

The non-dynamic or semi-static scheduling as mentioned herein may comprise the configured scheduling for NR, the semi-persistent scheduling (SPS) for LTE, or any other scheduling scheme for allocating/configuring semi-static periodic assignments or grants to a terminal device by a network node. According to some exemplary embodiments, a CG may comprise some scheduling configuration for a UE, for example, resource allocation, transmission parameters such as MCS, a rank indicator (RI), a precoding matrix indicator (PMI), etc. Correspondingly, the UE may perform UL transmission according to the CG.

According to a first aspect of the present disclosure, there is provided a method performed by a terminal device such as a UE. The method comprises receiving, from a network node, signaling information indicating an adjustment amount of a parameter for a transmission from the terminal device to the network node. The transmission is based at least in part on a semi-static scheduling configuration for the terminal device by the network node. Optionally, the method may further comprise processing the signaling information.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a receiving unit and optionally a processing unit. In accordance with some exemplary embodiments, the receiving unit is operable to carry out at least the receiving step of the method according to the first aspect of the present disclosure. The processing unit is operable to carry out at least the processing step of the method according to the first aspect of the present disclosure.

According to a fifth aspect of the present disclosure, there is provided a method performed by a network node such as a base station. The method comprises determining an adjustment amount of a parameter for a transmission from a terminal device to the network node. The transmission is based at least in part on a semi-static scheduling configuration for the terminal device by the network node. The method further comprises transmitting signaling information to the terminal device to indicate the adjustment amount of the parameter.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a determining unit and a transmitting unit. In accordance with some exemplary embodiments, the determining unit is operable to carry out at least the determining step of the method according to the fifth aspect of the present disclosure. The transmitting unit is operable to carry out at least the transmitting step of the method according to the fifth aspect of the present disclosure.

According to a ninth aspect of the present disclosure, there is provided a method performed by a terminal device such as a UE. The method comprises determining an adjustment amount of a parameter for a transmission from the terminal device to a network node. The transmission is based at least in part on a semi-static scheduling configuration for the terminal device by the network node. The method further comprises transmitting signaling information to the network node to indicate the adjustment amount of the parameter.

According to a tenth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a terminal device. The apparatus comprises a determining unit and a transmitting unit. In accordance with some exemplary embodiments, the determining unit is operable to carry out at least the determining step of the method according to the ninth aspect of the present disclosure. The transmitting unit is operable to carry out at least the transmitting step of the method according to the ninth aspect of the present disclosure.

According to a thirteenth aspect of the present disclosure, there is provided a method performed by a network node such as a base station. The method comprises receiving, from a terminal device, signaling information indicating an adjustment amount of a parameter for a transmission from the terminal device to the network node. The transmission is based at least in part on a semi-static scheduling configuration for the terminal device by the network node. Optionally, the method may further comprise processing the signaling information.

According to a fourteenth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a network node. The apparatus comprises a receiving unit and optionally a processing unit. In accordance with some exemplary embodiments, the receiving unit is operable to carry out at least the receiving step of the method according to the thirteenth aspect of the present disclosure. The processing unit is operable to carry out at least the processing step of the method according to the thirteenth aspect of the present disclosure.

In accordance with an exemplary embodiment, the signaling information according to any of the first and fifth aspects of the present disclosure may comprise at least one of: downlink control information (DCI), downlink feedback information (DFI), a control element for medium access control (MAC CE) and a radio resource control (RRC) signaling message.

In accordance with an exemplary embodiment, the signaling information according to any of the ninth and thirteenth aspects of the present disclosure may comprise at least one of: uplink control information (UCI), a MAC CE and an RRC signaling message.

In accordance with an exemplary embodiment, the adjustment amount of the parameter may comprise a specific increment in a value of the parameter, or a specific decrement in a value of the parameter.

In accordance with an exemplary embodiment, the adjustment amount of the parameter may be indicated by one or more bits in the signaling information.

In accordance with an exemplary embodiment, the indication of the adjustment amount of the parameter by the signaling information from the network node to the terminal device can enable the terminal device to adjust at least one of: the parameter corresponding to the adjustment amount, and one or more other parameters for the transmission from the terminal device to the network node.

In accordance with an exemplary embodiment, the indication of the adjustment amount of the parameter by the signaling information from the terminal device to the network node can inform the network node that the terminal device is to adjust at least one of: the parameter corresponding to the adjustment amount, and one or more other parameters for the transmission from the terminal device to the network node.

In accordance with an exemplary embodiment, the adjustment to the one or more other parameters may be based at least in part on the adjustment to the parameter.

In accordance with an exemplary embodiment, the signaling information indicating the adjustment amount of the parameter may indicate at least one of: the parameter and the one or more other parameters.

In accordance with an exemplary embodiment, the adjustment amount of the parameter may be determined or configured per cell, per carrier, per bandwidth part (BWP), per sub-band, per channel, per terminal device, or per semi-static scheduling configuration.

In accordance with an exemplary embodiment, the adjustment amount of the parameter may be applicable to one or more semi-static scheduling configurations (such as CG configurations).

In accordance with an exemplary embodiment, the signaling information indicating the adjustment amount of the parameter may indicate the one or more semi-static scheduling configurations by at least one of: a bitmap, an index, and an identifier (ID) of a hybrid automatic repeat request (HARQ) process.

In accordance with an exemplary embodiment, the adjustment amount of the parameter may be selected from a set of candidate adjustment amounts available for the parameter.

In accordance with an exemplary embodiment, the set of candidate adjustment amounts may be preconfigured to the terminal device by an RRC signaling from the network node.

In accordance with an exemplary embodiment, the signaling information indicating the adjustment amount of the parameter may indicate a time at which the adjustment amount of the parameter is to be applied by the terminal device.

In accordance with an exemplary embodiment, the method according to the first aspect of the present disclosure may further comprise receiving first DFI from the network node. The first DFI may indicate to the terminal device how to process second DFI from the network node. The signaling information according to the first aspect of the present disclosure may be carried in the second DFI. Optionally, the second DFI may be sharable by the terminal device with one or more other terminal devices.

In accordance with an exemplary embodiment, the method according to the first aspect of the present disclosure may further comprise transmitting another MAC CE to the network node to confirm reception of the signaling information by the terminal device. Optionally, said another MAC CE may indicate at least one of a semi-static scheduling configuration, a cell, a carrier, a BWP, a sub-band and a channel, to confirm reception of the associated adjustment amount of the parameter by the terminal device.

In accordance with an exemplary embodiment, the method according to the first aspect of the present disclosure may further comprise performing the transmission from the terminal device to the network node. The parameter for the transmission may be adjusted according to the adjustment amount of the parameter. Optionally, the transmission from the terminal device to the network node is for UL traffic of the terminal device, and no transmission for the UL traffic has been scheduled to the network node prior to the transmission of said another MAC CE from the terminal device to the network node.

In accordance with an exemplary embodiment, the method according to any of the first and ninth aspects of the present disclosure may further comprise receiving configuration information from the network node by the terminal device. The configuration information may indicate whether the network node or the terminal device is enabled to initiate an adjustment of a transmission parameter for the terminal device.

In accordance with an exemplary embodiment, the method according to the fifth aspect of the present disclosure may further comprise transmitting first DFI to the terminal device. The first DFI may indicate to the terminal device how to process second DFI from the network node. The signaling information according to the fifth aspect of the present disclosure may be carried in the second DFI. Optionally, the second DFI may be sharable by the terminal device with one or more other terminal devices.

In accordance with an exemplary embodiment, the method according to the fifth aspect of the present disclosure may further comprise receiving another MAC CE from the terminal device to confirm reception of the signaling information by the terminal device. Optionally, said another MAC CE may indicate at least one of a semi-static scheduling configuration, a cell, a carrier, a BWP, a sub-band and a channel, to confirm reception of the associated adjustment amount of the parameter by the terminal device.

In accordance with an exemplary embodiment, the method according to the fifth aspect of the present disclosure may further comprise receiving the transmission from the terminal device to the network node. The parameter for the transmission may be adjusted according to the adjustment amount of the parameter. Optionally, the transmission from the terminal device to the network node is for UL traffic of the terminal device, and no transmission for the UL traffic has been scheduled to the network node prior to the reception of said another control element for medium access control by the network node.

In accordance with an exemplary embodiment, the method according to any of the fifth and thirteenth aspects of the present disclosure may further comprise transmitting configuration information from the network node to the terminal device to indicate whether the network node or the terminal device is enabled to initiate an adjustment of a transmission parameter for the terminal device.

In accordance with an exemplary embodiment, the method according to the ninth aspect of the present disclosure may further comprise receiving another MAC CE from the network node to confirm reception of the signaling information by the network node. Optionally, said another MAC CE may indicate at least one of a semi-static scheduling configuration, a cell, a carrier, a BWP, a sub-band and a channel, to confirm reception of the associated adjustment amount of the parameter by the network node.

In accordance with an exemplary embodiment, the method according to the ninth aspect of the present disclosure may further comprise performing the transmission from the terminal device to the network node. The parameter for the transmission may be adjusted according to the adjustment amount of the parameter. Optionally, the transmission from the terminal device to the network node is for UL traffic of the terminal device, and no transmission for the UL traffic has been scheduled to the network node prior to the reception of said another MAC CE from the network node by the terminal device.

In accordance with an exemplary embodiment, the method according to the thirteenth aspect of the present disclosure may further comprise transmitting another MAC CE to the terminal device to confirm reception of the signaling information by the network node. Optionally, said another MAC CE may indicate at least one of a semi-static scheduling configuration, a cell, a carrier, a BWP, a sub-band and a channel, to confirm reception of the associated adjustment amount of the parameter by the network node.

In accordance with an exemplary embodiment, the method according to the thirteenth aspect of the present disclosure may further comprise receiving the transmission from the terminal device to the network node. The parameter for the transmission may be adjusted according to the adjustment amount of the parameter. Optionally, the transmission from the terminal device to the network node is for UL traffic of the terminal device, and no transmission for the UL traffic has been scheduled to the network node prior to the transmission of said another MAC CE from the network node to the terminal device.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
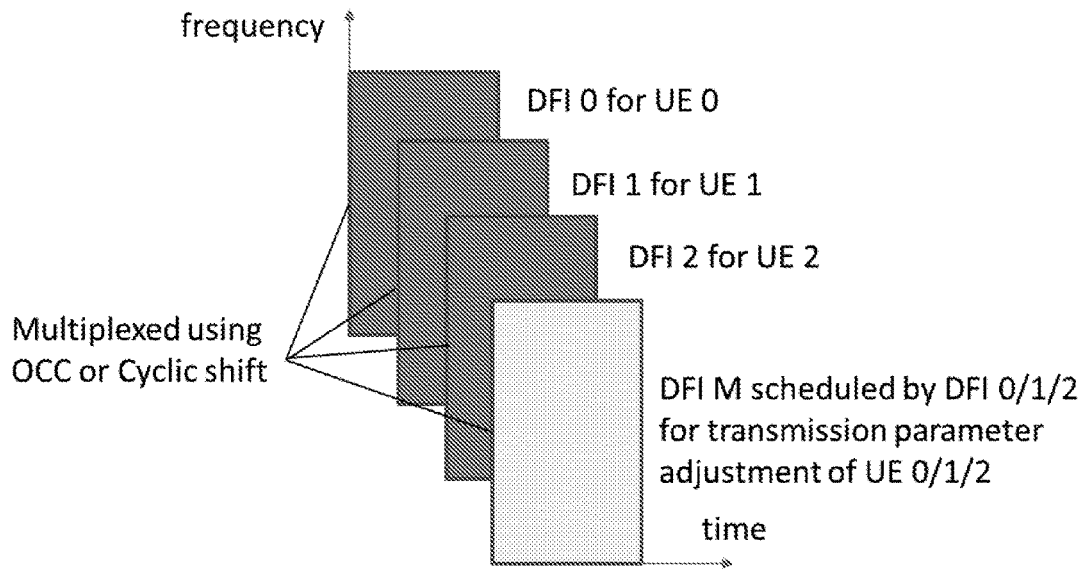
FIG. 1 is a diagram illustrating an example of transmission parameter adjustment according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment.

The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. Currently a 5G/NR network is developed for maximum flexibility to support multiple and substantially different use cases. Besides the typical mobile broadband use case, the 5G/NR network can also support machine type communication (MTC), ultra-low latency critical communications (URLCC), side-link device-to-device (D2D) and several other use cases.

In a NR network, the basic scheduling unit is called a slot. A slot consists of 14 orthogonal frequency division multiplexing (OFDM) symbols for the normal cyclic prefix configuration. The NR network can support many different subcarrier spacing (SCS) configurations, and at an SCS of 30 kHz the OFDM symbol duration is about 33 µs. As an example, a slot with 14 OFDM symbols for the same SCS is 500 µs long (including cyclic prefixes).

The NR network can also support flexible bandwidth configurations for different UEs on the same serving cell. In other words, the bandwidth monitored by a UE and used for its control and data channels may be smaller than the carrier bandwidth. One or more BWP configurations for each component carrier can be semi-statically signaled to a UE, where a BWP may consist of a group of contiguous physical resource blocks (PRBs). Some reserved resources can be configured within the BWP. The bandwidth of a BWP may be equal to or smaller than the maximal bandwidth capability supported by a UE.

To meet dramatically increasing network requirements on traffic capacity and data rates, one interesting option for communication technique development is to allow a wireless communication network such as a 5G/NR network to be operable on the unlicensed band, in addition to the licensed band. By aggregation of licensed and unlicensed carriers, a radio device can benefit from the additional transmission capacity provided by the unlicensed band. NR-based access to unlicensed spectrum (NR-U) is proposed to enable the NR network to be operated in the unlicensed spectrum which may be sharable by various wireless communication systems.

Allowing unlicensed networks (e.g., networks which can operate in the shared spectrum or unlicensed spectrum) to effectively use the available spectrum is an attractive approach to increase system capacity. Although the unlicensed spectrum does not match the qualities of the licensed regime, solutions that allow an efficient use of the unlicensed spectrum as a complement to licensed deployments have the potential to bring great value to network operators, and ultimately, to the communication industry as a whole. It is expected that some features in NR may need to be adapted to comply with the special characteristics of the unlicensed band as well as different regulations. The SCS of 15 kHz or 30 kHz may be the most promising candidates for NR-U OFDM numerologies for frequencies below 6 GHz.

For operations in the unlicensed spectrum, a device may be required to sense the medium as free before transmission. This is often referred to as listen-before-talk or LBT for short. There are many different flavors of LBT, depending on which radio technology the device uses and which type of data the device wants to transmit at the moment. Common for all flavors is that the sensing is done in a particular channel (corresponding to a defined carrier frequency) and over a predefined bandwidth. For example, in the 5 GHz band, the sensing is done over 20 MHz channels. Many devices may be capable of transmitting and/or receiving over a wide bandwidth including multiple sub-bands/channels, e.g., LBT sub-band (i.e., the frequency part with bandwidth equal to LBT bandwidth). Typically, a device is allowed to transmit on the sub-bands where the medium is sensed as free. Again, there are different flavors of how the sensing needs to be done when multiple sub-bands are involved.

In principle, there may be two ways for a device to operate over multiple sub-bands. One way is that the transmitter/receiver bandwidth may be changed depending on which sub-bands are sensed as free. In this setup, there is only one component carrier (CC) and the multiple sub-bands are treated as a single channel with a larger bandwidth. The other way is that the device operates almost independent processing chains for each channel. Depending on how independent the processing chains are, this option can be referred to as carrier aggregation (CA) or dual connectivity (DC).

As mentioned previously, a channel access procedure in NR unlicensed spectrum may use an LBT mechanism to acquire a channel for transmission. The LBT mechanism is designed for the unlicensed spectrum co-existence with other radio access technologies (RATs). In this mechanism, a radio device may apply a clear channel assessment (CCA) check (i.e. channel sensing) before any transmission. The transmitter involves energy detection (ED) over a time period compared to a certain threshold (e.g., an ED threshold) in order to determine if a channel is idle. In the case that the channel is determined to be occupied, the transmitter can perform a random back-off within a contention window before next CCA attempt. In order to protect the acknowledgement (ACK) transmissions, the transmitter can defer a period after each busy CCA slot prior to resuming back-off. As soon as the transmitter has grasped access to a channel, the transmitter is allowed to perform transmission up to a maximum time duration (namely, the maximum channel occupancy time (MCOT)). For quality of service (QoS) differentiation, a channel access priority based on the service type can be defined. For example, there may be four LBT priority classes defined for differentiation of contention window sizes (CWS) and MCOT between services.

For NR-U, scheduling schemes such as configured scheduling and dynamic scheduling can be used. According to an exemplary embodiment, the configured scheduling may be used in a NR network to allocate semi-static periodic assignments or grants for a UE. For UL, there are two types of configured scheduling schemes: Type 1 and Type 2. For Type 1, some configured grants (CGs) are configured via RRC signaling only. For Type 2, a similar configuration procedure as SPS UL in an LTE network is defined, i.e. some parameters are preconfigured via RRC signaling and some physical layer parameters are configured via medium access control (MAC) scheduling procedure. The configured scheduling may be also used in NR unlicensed operation. For NR-U, the configured scheduling can significantly improve the channel access probability for physical uplink shared channel (PUSCH) transmission, because additional LBT procedure for physical downlink control channel (PDCCH) transmission per UL grant is avoided and the UE can acquire a channel for PUSCH transmission using a CG after an LBT procedure is successful. In this UL transmission procedure, only a single LBT procedure is needed compared to three LBT procedures (one for scheduling request (SR) transmission, one for PDCCH for UL grant, and one for PUSCH transmission) relying on a scheduling request/buffer status report (SR/BSR) procedure.

In accordance with some exemplary embodiments, it may be beneficial for NR in unlicensed spectrum to allow consecutive CG resources in time without any gaps in between the resources and non-consecutive CG resources (not necessarily periodic) with gaps in between the resources. In addition, certain enhancements of configured scheduling such as AUL may be applied for NR-U.

In a NR network, for a Type 1 CG, a UE can apply the MCS/TBS configured by a gNB via RRC signaling for a CG based transmission. In the case that it is needed to update the transmission pattern (such as MCS/TBS), the gNB can send an RRC reconfiguration signaling including a new MCS/TBS to the UE, which may be slow and not able to perform a fast transmission adaptation for the UE based on variation of the UE's link condition. For a Type 2 CG, the gNB is able to update the transmission parameters in activation DCI for the UE. Upon reception of the activation DCI for the Type 2 CG, the UE can provide a confirmation MAC CE to the gNB in the reverse link. However, it is not a good option for a gNB to frequently send activation DCI to update transmission parameters for a Type 2 CG, since this may deviate the design purpose of activation DCI which works in a more semi-static fashion, also, this may introduce high signaling overhead for PDCCH. Therefore, for both types of CG configuration schemes, the existing mechanisms are not sufficient to achieve fast and reliable update of transmission parameters for a CG.

According to some embodiments, there may be two options for update of transmission parameters for a CG, i.e., a gNB based option and a UE based option. In the gNB based option, transmission parameters (e.g., MCS, RI, PMI, sounding reference signal index (SRI), etc.) can be indicated in the configured grant-downlink feedback information (CG-DFI). For this option, the DCI signaling overhead is not much affected since the gNB anyway needs to provide hybrid automatic repeat request acknowledgement/negative acknowledgement (HARQ A/N) in the CG-DFI signaling. In the UE based option, a UE can indicate some transmission parameters (e.g., MCS, PMI, RI, SRI, etc.) in the configured grant-uplink control information (CG-UCI) to improve transmission efficiency. For either of the two options, direct inclusion of transmission parameters in UCI or DFI may increase the signaling overhead. On the other hand, in the case that a UE or a gNB receives an update of transmission parameters, there may be a need for the UE or the gNB to confirm reception of the updated parameters and apply these parameters accordingly.

In order to reduce signaling overhead for update of transmission parameters and improve the resource efficiency of a communication network, various exemplary embodiments of the present disclosure propose a transmission adaptation solution for UL transmission (such as PUSCH transmission) with a CG. The proposed solution can enable an update of transmission parameters to be indicated by a signaling message such as DFI/DCI/UCI in an efficient fashion, so as to reduce the signaling overhead in the DFI/DCI/UCI with improved resource utilization. In addition, the proposed solution can enable the UE/gNB to confirm reception of the update of transmission parameters and apply the updated parameters accordingly, without significantly increasing processing complexity.

In accordance with some exemplary embodiments, transmission adaptation may be triggered or initiated by a gNB or a UE (i.e., gNB based transmission adaptation or UE based transmission adaptation). The gNB may configure one of the gNB and the UE to be capable of triggering the transmission adaptation. The configuration can be per cell/carrier/BWP/channel/UE/CG configuration. According to an exemplary embodiment, the gNB can inform the UE, for example, in a DL signaling message such as DCI/DFI, whether the gNB based transmission adaptation or the UE based transmission adaptation is enabled.

In accordance with some exemplary embodiments, for the gNB based transmission adaptation, a transmission parameter adjustment such as MCS adjustment for a UE may be signaled via one or more bits in the DFI/DCI/MAC CE/RRC signaling by a gNB. For the UE based transmission adaptation, a transmission parameter adjustment such as MCS adjustment for a UE may be signaled via one or more bits in the UCI/MAC CE/RRC signaling by the UE. According to an embodiment, a single bit in the DCI/DFI/UCI/MAC CE/RRC signaling may be used for indicating the MCS adjustment for the UE or a group of UEs. As an example, value 1 means increase of the MCS value by a given step (e.g., the MCS index is increased by 1), and value 0 means decrease of the MCS value by a given step (e.g., the MCS index is decreased by 1). According to an embodiment, the increase/decrease step size can be preconfigured, for example, per transmission parameter or for a group of transmission parameters. It can be appreciated that although some embodiments are described in the context of MCS adjustment, other transmission parameters (e.g., RI, PMI, SRI, etc.) can also be updated/adjusted by using the methods according to various embodiments of the present disclosure.

In accordance with some exemplary embodiments, the configuration of transmission adaptation can be per cell/carrier/BWP/channel/sub-band/UE/CG configuration. The MCS adjustment carried by the DCI/DFI/UCI/MAC CE/RRC signaling may be applicable to one or more scheduling/resource configurations. Optionally, the DCI/DFI/UCI/MAC CE/RRC signaling may also indicate one or more types of parameters to which the adjustment needs to be applied. As an example, the DCI/DFI/UCI/MAC CE/RRC signaling may carry an indicator of a specific parameter type for adjustment, so that the adjustment can be applied to the specified parameter type. In another example, the DCI/DFI/UCI/MAC CE/RRC signaling may not indicate any parameter type for adjustment, meaning that the adjustment is applicable to all relevant transmission parameters.

According to an exemplary embodiment, a gNB may configure a set of candidate transmission parameter values for MCS, RI and MCS table, etc., for example, via RRC signaling. The gNB can select a candidate value from the set of candidate transmission parameter values and indicate the selected value to a UE, for example, via a DL signaling message such as DCI/DFI which can carry a corresponding index of the selected value. Similarly, for UE based transmission adaptation, a UE can select a candidate value for a transmission parameter from a set of candidate transmission parameter values configured by a gNB, and signal a corresponding index of the selected value in an UL signaling message such as UCI.

In another exemplary embodiment, a gNB can use an indicator in first DFI to indicate to a UE whether a transmission parameter is to be updated using second DFI. According to the embodiment, the second DFI can enable reconfiguration of the corresponding transmission parameter. In the case that the UE is indicated, upon reception of the first DFI, that a transmission parameter is to be updated, the UE can further receive the second DFI to detect the corresponding new transmission parameter and/or a change value of the transmission parameter. In this way, the fixed overhead due to inclusion of the transmission parameter and HARQ A/N in the same DFI can be avoided.

FIG. 1 is a diagram illustrating an example of transmission parameter adjustment according to an embodiment of the present disclosure. The example shown in FIG. 1 may be applicable to a NR scenario where a UE is operated in an unlicensed carrier. It will be appreciated that the exemplary transmission parameter adjustment may also be applicable to other scenarios where a communication network may operate on licensed spectrum and apply or support various radio interface technologies which are not limited to LTE and NR technologies.

In the example shown in FIG. 1, DFI 0 for UE 0, DFI 1 for UE 1, DFI 2 for UE 2 and DFI M may be multiplexed using orthogonal cover code (OCC) or cyclic shift. DFI M may be scheduled by DFI 0/1/2 for transmission parameter adjustment of UE 0/1/2. According to an exemplary embodiment, first DFI such as DFI 0/1/2 may only carry HARQ A/N, while second DFI such as DFI M subsequent to the first DFI can carry updated transmission parameters and/or a set of change values of the transmission parameters. As shown in FIG. 1, UE x (x=0, 1 or 2) may receive both DFI x and DFI M at the same time or at different time. Then UE x can decode DFI x first. If DFI x indicates that DFI M is transmitted for UE x, this UE can further decode DFI M to derive the new transmission parameters. If DFI x indicates that DFI M is not transmitted for UE x, the UE can just discard the received signal for DFI M without decoding. Optionally, DFI M may be shared by DFI 0/1/2. This means that DFI 0/1/2 may be a UE dedicated signaling message while DFI M may be addressed to a group of UEs.

In accordance with some exemplary embodiments, a UE may have multiple active CG configurations. These CG configurations may be in the same or different carriers/LBT sub-bands. A gNB can use DFI (e.g., DFI M shown in FIG. 1) or DCI to indicate the transmission parameter change for all or some of activated CG configurations. Similarly, the UE can use UCI to indicate the transmission parameter change for at least a part of the activated CG configurations. According to an embodiment, in the DFI/DCI/UCI, a bitmap may be defined to indicate which CG configuration(s) to apply the transmission parameter change as signaled by the DFI/DCI/UCI. In another embodiment, a CG configuration index may be carried by the DFI/DCI/UCI to indicate the corresponding CG configuration for which the transmission parameter change is to be applied. As yet another option, a HARQ process identifier (ID) may be signaled in the DFI/DCI/UCI to indicate which HARQ process needs to change transmission parameters. The indicated HARQ process may be associated with an activated CG configuration.

In response to reception of the DFI/DCI indicating the transmission parameter change, the UE can determine when to apply one or more new transmission parameters, for example, a time offset (e.g., x radio frames/slots/OFDM symbols) after the UE derives the new transmission parameters according to the received DFI/DCI. According to an exemplary embodiment, the time offset may be indicated in the DFI/DCI which signals the transmission parameter change to the UE. Alternatively or additionally, the UE can determine to use the new transmission parameters from the next transmission opportunity after the UE has sent a confirmation to the gNB for reception of the DFI/DCI. According to an exemplary embodiment where the transmission adaptation is triggered by a UE, the time at which the new transmission parameters are to be used by the UE can be informed to a gNB by the UE in a UL signaling message such as UCI.

In accordance with some exemplary embodiments, a UE may receive or select an adjustment to transmission parameters (e.g., MCS, RI, PMI, SRI, etc.) while there are pending HARQ transmissions. If the UE receives a negative acknowledgement (NACK) for a pending HARQ transmission/retransmission, the UE may trigger the HARQ retransmission using previous transmission parameters without making the adjustment to the transmission parameters. According to an exemplary embodiment, the new transmission parameters may be applicable to a new CG initial transmission and its potential retransmissions.

It can be appreciated that an indicator of the transmission parameter adjustment (e.g., an actual change value, an index of a change value, an index of a new value, etc.) according to various embodiments may also be signaled by a MAC CE and/or an RRC signaling message, in addition to or instead of the DFI/DCI/UCI. In response to reception of the DFI/DCI/UCI/MAC CE/RRC signaling message indicating the transmission parameter adjustment, the gNB (or the UE) can provide a confirmation to the UE (or the gNB).

In accordance with an exemplary embodiment where the transmission parameter adjustment for a corresponding CG configuration is carried in a downlink (DL) signaling message such as DFI, the UE can utilize the existing CG confirmation MAC CE to confirm reception of the transmission parameter adjustment. The existing CG confirmation MAC CE may need to be updated to include an indicator for indicating whether the confirmation is intended for the DFI carrying the transmission parameter adjustment or the DCI carrying activation/deactivation command for a CG. Optionally, one or more reserved bits in the MAC subheader may be redefined for this purpose.

Alternatively or additionally, a new MAC CE may be defined for confirmation of reception of the DFI carrying the transmission parameter adjustment for one or more CG configurations. In accordance with some exemplary embodiments, a CG configuration index or a bitmap of CG configurations may be indicated/carried in the new MAC CE to confirm the reception of the respective change values of transmission parameters. Optionally, the cell/carrier/BWP/sub-band/channel associated with the corresponding CG configuration may be indicated/carried in the new MAC CE.

For the case of UE based transmission adaptation, the UE can signal new transmission parameters and/or changes values of the transmission parameters in a UL signaling message such as UCI, the gNB may confirm with a MAC CE (e.g., the reused CG confirmation MAC CE or a new MAC CE) in response to reception of the UCI from the UE. Optionally, a CG configuration index or a bitmap indicating relevant CG configurations may be indicated/carried in the MAC CE. In an exemplary embodiment, the cell/carrier/BWP/sub-band/channel associated with the corresponding CG configuration may be indicated/carried in the MAC CE.

In can be appreciated that although various embodiments of the present disclosure are described in the context of NR unlicensed spectrum (NR-U), the proposed solution according to exemplary embodiments may not be limited to NR-U scenarios. The proposed solution may also be applicable to other unlicensed operation scenarios such as LTE licensed-assisted access (LAA), enhanced licensed-assisted access (eLAA), further enhanced licensed-assisted access (feLAA), MuLteFire, etc. In addition, it will be realized that the proposed solution according to exemplary embodiments may also be applicable to licensed operation scenarios where an adjustment to one or more transmission parameters (e.g., MCS, RI, PMI, SRI, etc.) may need to be signaled in a resource efficient manner.

Figure 2:
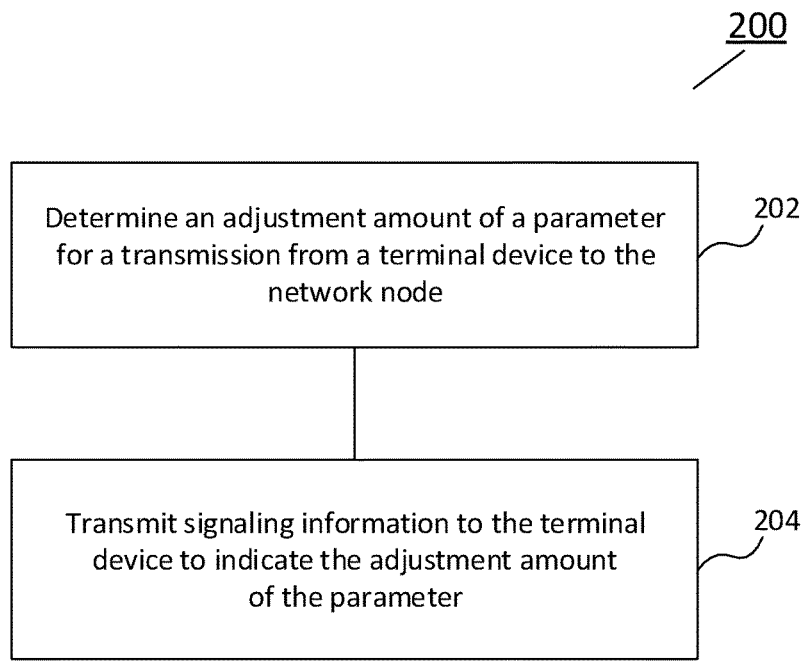
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by a network node or an apparatus communicatively coupled to the network node. In accordance with an exemplary embodiment, the network node may comprise a base station such as eNB/gNB. The network node can configure radio resources and schedule transmissions for a terminal device such as UE. For example, the network node can allocate radio resources to the terminal device, and issue a UL grant (such as a static grant, a CG, a semi-static grant or a dynamic grant) to schedule UL transmission from the terminal device. In accordance with an exemplary embodiment, the network node can provide a semi-static scheduling configuration for the terminal device and initiate transmission parameter adjustment for the semi-static scheduling configuration.

According to the exemplary method 200 illustrated in FIG. 2, the network node can determine an adjustment amount of a parameter for a transmission from a terminal device to the network node, as shown in block 202. In an embodiment, the transmission from the terminal device to the network node may be based at least in part on a semi-static scheduling configuration (e.g., CG configuration) for the terminal device by the network node. Then, the network node can transmit signaling information to the terminal device to indicate the adjustment amount of the parameter, as shown in block 204.

In accordance with some exemplary embodiments, the signaling information transmitted by the network node may comprise at least one of DCI, DFI, a MAC CE and an RRC signaling message. It can be appreciated that the signaling information may also be carried in other suitable types of messages from the network node to the terminal device. According to an exemplary embodiment, the adjustment amount of the parameter may be indicated by one or more bits in the signaling information. In order to reduce signaling overhead, the adjustment amount of the parameter may comprise a specific increment or decrement in a value of the parameter. For example, the specific increment or decrement may be an actual change value, or a given step size corresponding to a range of change values. It will be realized that although various embodiments are described with respect to a scenario where a relative change value of the parameter is indicated by the signaling information, the proposed solution according to exemplary embodiments may also be applicable to the scenarios where an absolute value of the updated parameter or its index is signaled for transmission adaptation.

In accordance with some exemplary embodiments, the indication of the adjustment amount of the parameter by the signaling information transmitted from the network node can enable the terminal device to adjust the parameter corresponding to the adjustment amount, and/or one or more other parameters for the transmission from the terminal device to the network node. These parameters may comprise various transmission parameters, such as MCS, RI, PMI, SRI, etc. Optionally, the signaling information may indicate at least one of the parameter and the one or more other parameters. Thus, the terminal device can know which parameter(s) may need to be updated. Alternatively or additionally, the signaling information may not indicate any parameter, which means all parameters for the transmission from the terminal device to the network node may need to be adjusted.

In accordance with some exemplary embodiments, the adjustment to the one or more other parameters may be based at least in part on the adjustment to the parameter. For example, the increase of the current value of the parameter may imply that the current values of the one or more other parameters may also need to be increased. If the signaling information indicates the terminal device to decrease the current value of the parameter according to the adjustment amount, the current values of the one or more other parameters may also need to be decreased correspondingly. Optionally, the signaling information may indicate a time at which the adjustment amount of the parameter is to be applied by the terminal device.

In accordance with some exemplary embodiments, the adjustment amount of the parameter may be determined or configured per cell, per carrier, per BWP, per sub-band, per channel, per terminal device, or per semi-static scheduling configuration. Optionally, the adjustment amount of the parameter may be applicable to one or more semi-static scheduling configurations. According to an exemplary embodiment, the signaling information may indicate the one or more semi-static scheduling configurations by using a bitmap, an index, an identifier of a HARQ process, and/or any other suitable indicator.

In accordance with some exemplary embodiments, the adjustment amount of the parameter may be selected from a set of candidate adjustment amounts available for the parameter. As an example, the set of candidate adjustment amounts may be preconfigured to the terminal device by RRC signaling from the network node. The network node can reconfigure the transmission parameter for the terminal device by selecting a target value from the set of candidate adjustment amounts and signaling the selected value to the terminal device.

In accordance with some exemplary embodiments, the network node may transmit first DFI (such as DFI 0/1/2 in FIG. 1) to the terminal device, and the signaling information as described in block 204 of FIG. 2 may be carried in second DFI (such as DFI M in FIG. 1) from the network node to the terminal device. The first DFI can indicate to the terminal device how to process the second DFI. For example, if the first DFI indicates that the adjustment amount of the parameter for the terminal device is carried in the second DFI, the terminal device can decode the second DFI to obtain the adjustment amount of the parameter. If the first DFI indicates that there is no update on the parameter for the terminal device or that the second DFI is not intended for the terminal device, the terminal device can discard the second DFI, or the terminal device may not even receive the second DFI (e.g., if the first DFI and the second DFI are transmitted at different time). Optionally, the second DFI may be sharable by the terminal device with one or more other terminal devices.

In accordance with some exemplary embodiments, the network node may receive a MAC CE from the terminal device to confirm reception of the signaling information by the terminal device. Optionally, this MAC CE may indicate at least one of a semi-static scheduling configuration, a cell, a carrier, a BWP, a sub-band and a channel, to confirm reception of the associated adjustment amount of the parameter by the terminal device.

In accordance with some exemplary embodiments, the network node can receive the transmission from the terminal device and the parameter for the transmission may be adjusted according to the adjustment amount of the parameter. The transmission from the terminal device to the network node is for UL traffic of the terminal device, and no transmission for the UL traffic has been scheduled to the network node prior to the reception of the confirmation MAC CE from the terminal device by the network node. That is to say, the terminal device may use the adjusted/updated transmission parameter for the newly scheduled initial transmission and its potential retransmission, but not for the pending HARQ transmission/retransmission.

In accordance with some exemplary embodiments, the network node can transmit configuration information to the terminal device to indicate whether the network node or the terminal device is enabled to initiate an adjustment of a transmission parameter for the terminal device. In this case, the configuration of whether the network node based transmission adaptation or the terminal device based transmission adaptation is triggered can be at least partially controlled by the network node.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3:
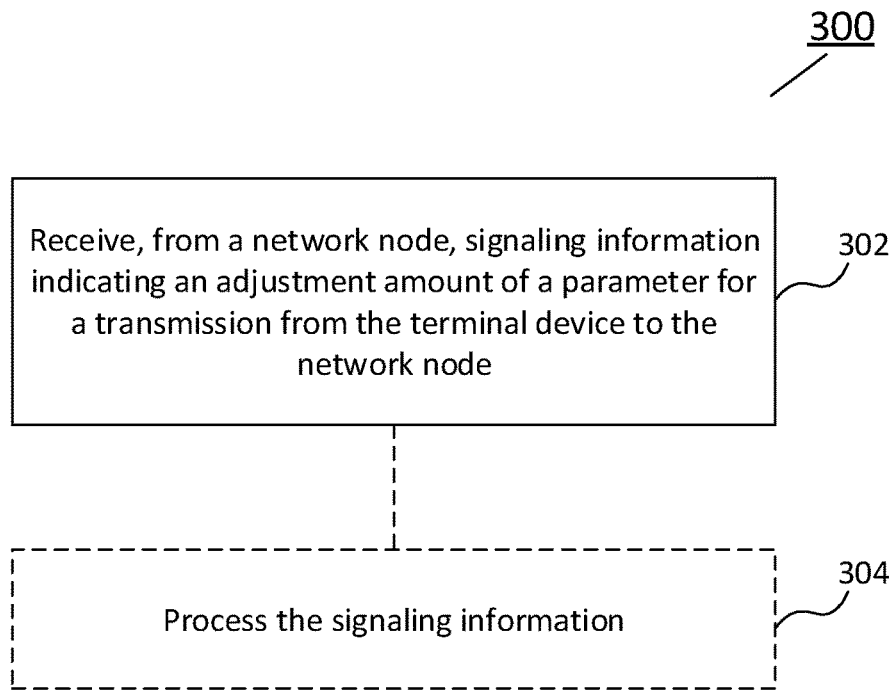
FIG. 3 is a flowchart illustrating another method according to some embodiments of the present disclosure.

FIG. 3 is a flowchart illustrating a method 300 according to some embodiments of the present disclosure. The method 300 illustrated in FIG. 3 may be performed by a terminal device or an apparatus communicatively coupled to the terminal device. In accordance with an exemplary embodiment, the terminal device such as UE may be configured with radio resources in the licensed bands and/or the unlicensed bands by a network node (such as the network node described with respect to FIG. 2). For example, the terminal device may obtain a UL grant (such as a static grant, a CG, a semi-static grant or a dynamic grant) from the network node to schedule UL transmission. In accordance with an exemplary embodiment, the terminal device may be provisioned one or more semi-static scheduling configurations by the network node to save the signaling overhead and improve latency performance.

According to the exemplary method 300 illustrated in FIG. 3, the terminal device can receive, from a network node, signaling information indicating an adjustment amount of a parameter for a transmission from the terminal device to the network node, as shown in block 302. The transmission from the terminal device to the network node may be based at least in part on a semi-static scheduling configuration for the terminal device by the network node. Optionally, in response to the reception of the signaling information, the terminal device may process the signaling information, as shown in block 304. For instance, the processing of the signaling information by the terminal device may comprise decoding or discarding the signaling information. It is noted that operations/steps of the method 300 illustrated in FIG. 3 may correspond to operations/steps of the method 200 illustrated in FIG. 2, and the signaling information received by the terminal device in block 302 may be corresponding to the signaling information transmitted by the network node in block 204.

In accordance with some exemplary embodiments, the terminal device may receive first DFI from the network node to indicate how to process second DFI from the network node. As described in connection with FIG. 2, the signaling information from the network node may be carried in the second DFI which can be sharable by the terminal device with one or more other terminal devices.

In accordance with some exemplary embodiments, the terminal device may transmit a MAC CE to the network node to confirm reception of the signaling information by the terminal device. Optionally, the semi-static scheduling configuration/cell/carrier/BWP/sub-band/channel associated with the received adjustment amount of the parameter may be indicated in this confirmation MAC CE from the terminal device. According to the adjustment amount of the parameter, the terminal device can adjust/update a value of the parameter and perform the corresponding transmission for UL traffic of the terminal device to the network node. In an embodiment, no transmission for the UL traffic has been scheduled to the network node prior to the transmission of the confirmation MAC CE from the terminal device to the network node.

In accordance with some exemplary embodiments, the initiator of the transmission adaptation may be dynamically configured or changed. As described with respect to FIG. 2, the terminal device may receive configuration information from the network node, and the configuration information can enable the capability of the network node or the terminal device to initiate an adjustment of a transmission parameter for the terminal device.

Figure 4:
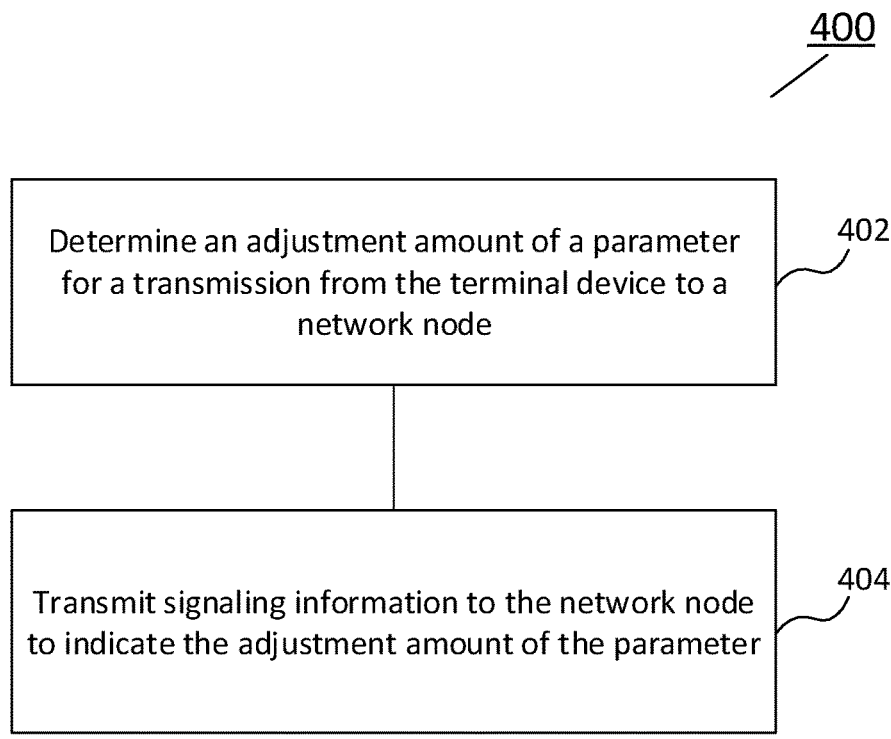
FIG. 4 is a flowchart illustrating a further method according to some embodiments of the present disclosure.

FIG. 4 is a flowchart illustrating a method 400 according to some embodiments of the present disclosure. The method 400 illustrated in FIG. 4 may be performed by a terminal device or an apparatus communicatively coupled to the terminal device. In accordance with an exemplary embodiment, the terminal device such as UE may be capable of initiating an adjustment of a transmission parameter for the terminal device. It can be appreciated that the terminal device as described with respect to FIG. 4 may also be configured to perform the method 300 illustrated in FIG. 3. Similarly, the terminal device as described with respect to FIG. 3 can also perform the method 400 illustrated in FIG. 4 in the case that the terminal device is equipped with the capability of triggering transmission adaptation.

According to the exemplary method 400 illustrated in FIG. 4, the terminal device can determine an adjustment amount of a parameter for a transmission from the terminal device to a network node, as shown in block 402. The transmission from the terminal device to the network node may be based at least in part on a semi-static scheduling configuration (e.g., CG configuration) for the terminal device by the network node. Then, the terminal device can transmit signaling information to the network node to indicate the adjustment amount of the parameter, as shown in block 404. In accordance with some exemplary embodiments, the signaling information transmitted by the terminal device may comprise at least one of UCI, a MAC CE and an RRC signaling message.

It can be appreciated that the signaling information described with respect to FIG. 4 may have the same or similar configuration/format/function as that of the signaling information described with respect to FIG. 2 and FIG. 3. Various embodiments of the signaling information described in connection with FIG. 2 and FIG. 3 may also be applicable to the signaling information described in connection with FIG. 4.

According to the exemplary method 400 illustrated in FIG. 4, the indication of the adjustment amount of the parameter by the signaling information transmitted from the terminal device can inform the network node that the terminal device is to adjust at least one of: the parameter corresponding to the adjustment amount, and one or more other parameters for the transmission from the terminal device to the network node.

In accordance with some exemplary embodiments, the terminal device may receive a MAC CE from the network node to confirm reception of the signaling information by the network node. Optionally, this MAC CE may indicate that the adjustment amount of the parameter is received by the network node for the associated resource and transmission configuration, for example, a semi-static scheduling configuration, a cell, a carrier, a BWP, a sub-band, a channel, etc.

In accordance with some exemplary embodiments, the terminal device can perform the transmission from the terminal device to the network node by using the parameter which is adjusted according to the adjustment amount of the parameter. In an exemplary embodiment, the transmission from the terminal device to the network node is for UL traffic of the terminal device, and no transmission for the UL traffic has been scheduled to the network node prior to the reception of the confirmation MAC CE from the network node by the terminal device.

Figure 5:
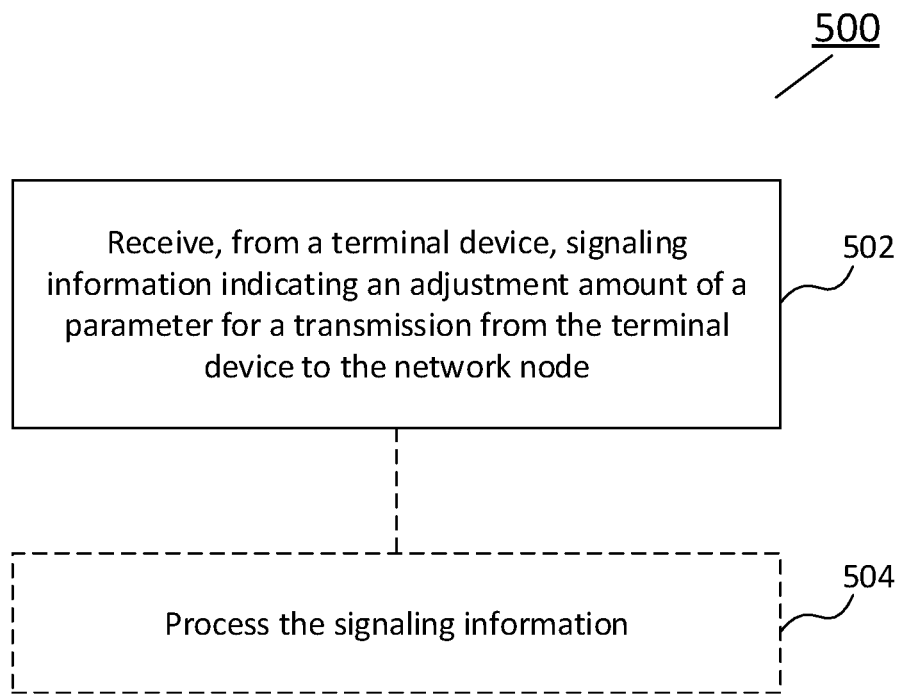
FIG. 5 is a flowchart illustrating yet another method according to some embodiments of the present disclosure.

FIG. 5 is a flowchart illustrating a method 500 according to some embodiments of the present disclosure. The method 500 illustrated in FIG. 5 may be performed by a network node or an apparatus communicatively coupled to the network node. In accordance with an exemplary embodiment, the network node such as a base station can configure radio resources and transmission scheduling for a terminal device (such as the terminal device described in connection with FIG. 4). It can be appreciated that the network node as described with respect to FIG. 2 may also be configured to perform the method 500 illustrated in FIG. 5. Similarly, the network node as described with respect to FIG. 5 can also perform the method 200 illustrated in FIG. 2 in the case that the network node is equipped with the capability of triggering transmission adaptation.

According to the exemplary method 500 illustrated in FIG. 5, the network node can receive, from a terminal device, signaling information indicating an adjustment amount of a parameter for a transmission from the terminal device to the network node, as shown in block 502. As described in connection with FIG. 4, the transmission may be based at least in part on a semi-static scheduling configuration for the terminal device by the network node. Optionally, in response to the reception of the signaling information, the network node may process the signaling information, as shown in block 504. For example, the processing of the signaling information by the network node may comprise decoding the signaling information (e.g., UCI, a MAC CE, an RRC signaling message, etc.) and obtain the adjustment amount of the parameter indicated by the signaling information. Thus, the network node can be informed by the signaling information that the terminal device is to adjust one or more parameters for UL transmission. It is noted that operations/steps of the method 500 illustrated in FIG. 5 may correspond to operations/steps of the method 400 illustrated in FIG. 4, and the signaling information received by the network node in block 502 may be corresponding to the signaling information transmitted by the terminal device in block 404.

In accordance with some exemplary embodiments, the network node can transmit a MAC CE to the terminal device to confirm reception of the signaling information by the network node. In response to the confirmation of reception of the signaling information and the corresponding adjustment amount of the parameter by the network node, the terminal device can use the adjusted/updated parameter for the UL transmission to the network node. Optionally, the confirmation MAC CE from the network node may indicate one or more resource and transmission configurations associated with the transmission adaptation initiated by the terminal device.

In accordance with some exemplary embodiments, the network node can receive the transmission for UL traffic from the terminal device using the adjusted parameter. According to an exemplary embodiment, no transmission for the UL traffic has been scheduled to the network node prior to the transmission of the confirmation MAC CE from the network node to the terminal device.

The proposed solution according to one or more exemplary embodiments can enable transmission adaptation for UL transmission in a semi-static scheduling configuration to be implemented with less overhead, so that a network node and/or a terminal device can make transmission parameters adaptive to communication conditions in a faster and flexible manner. According to some exemplary embodiment, in the case that one of a base station and a UE triggers transmission adaptation to adjust at least a parameter for UL transmission with a CG, a change value or an adjustment amount of the parameter can be signaled to the other of the base station and the UE. According to the proposed solution, it is not necessary to directly signal the new transmission parameters. For some cases, it is enough to use only one bit to indicate the adjustment amount of the transmission parameter(s), which can reduce overhead for a signaling message (e.g., DFI, DCI, UCI, MAC CE, RRC signaling, etc.) in an efficient way. On the other hand, according to the proposed solution, it is easier for the network node and/or the terminal device to confirm reception of a signaling message indicating the transmission parameter adjustment. Thus, the autonomous UL HARQ retransmission performance can be enhanced and meanwhile the latency requirement can also be ensured.

The various blocks shown in FIGS. 2-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
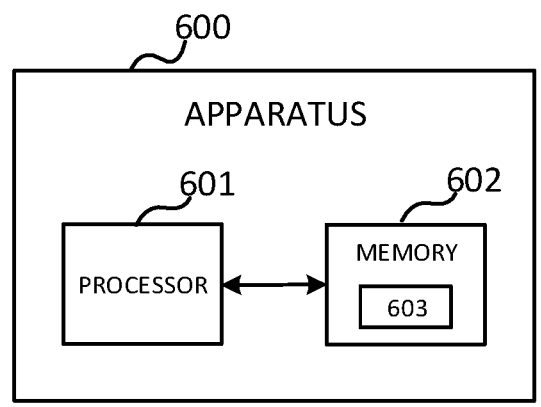
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a network node as described with respect to FIG. 2 or FIG. 5, or a terminal device as described with respect to FIG. 3 or FIG. 4. In such case, the apparatus 600 may be implemented as a network node as described with respect to FIG. 2 or FIG. 5, or a terminal device as described with respect to FIG. 3 or FIG. 4.

In some implementations, the one or more memories 602 and the computer program codes 603 may be configured to, with the one or more processors 601, cause the apparatus 600 at least to perform any operation of the method as described in connection with FIG. 2. In some implementations, the one or more memories 602 and the computer program codes 603 may be configured to, with the one or more processors 601, cause the apparatus 600 at least to perform any operation of the method as described in connection with FIG. 3. In some implementations, the one or more memories 602 and the computer program codes 603 may be configured to, with the one or more processors 601, cause the apparatus 600 at least to perform any operation of the method as described in connection with FIG. 4. In other implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
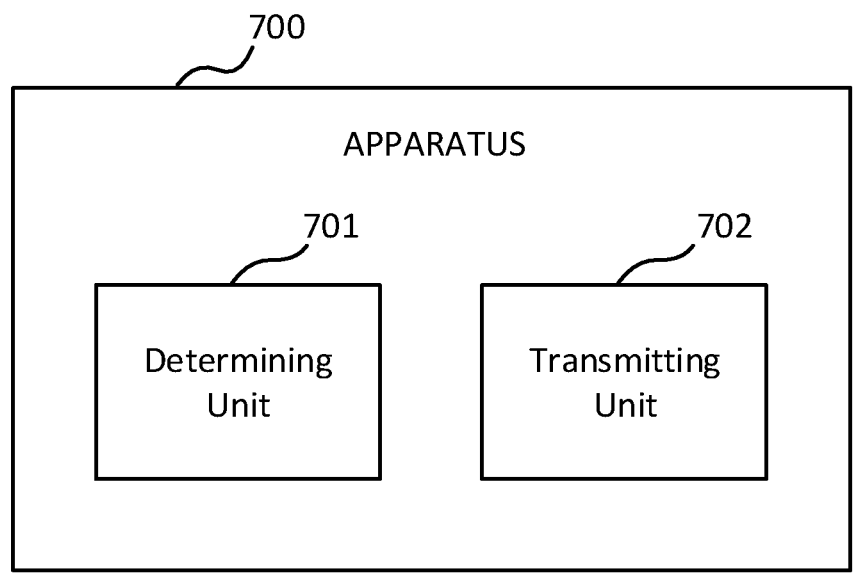
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701 and a transmitting unit 702. In an exemplary embodiment, the apparatus 700 may be implemented in a network node such as the network node as describe with respect to FIG. 2. The determining unit 701 may be operable to carry out the operation in block 202, and the transmitting unit 702 may be operable to carry out the operation in block 204. In another exemplary embodiment, the apparatus 700 may be implemented in a terminal device such as the terminal device as describe with respect to FIG. 4. The determining unit 701 may be operable to carry out the operation in block 402, and the transmitting unit 702 may be operable to carry out the operation in block 404. Optionally, the determining unit 701 and/or the transmitting unit 702 may be operable to carry out more or less operations to implement the proposed methods according to the exemplary embodiments of the present disclosure.

Figure 8:
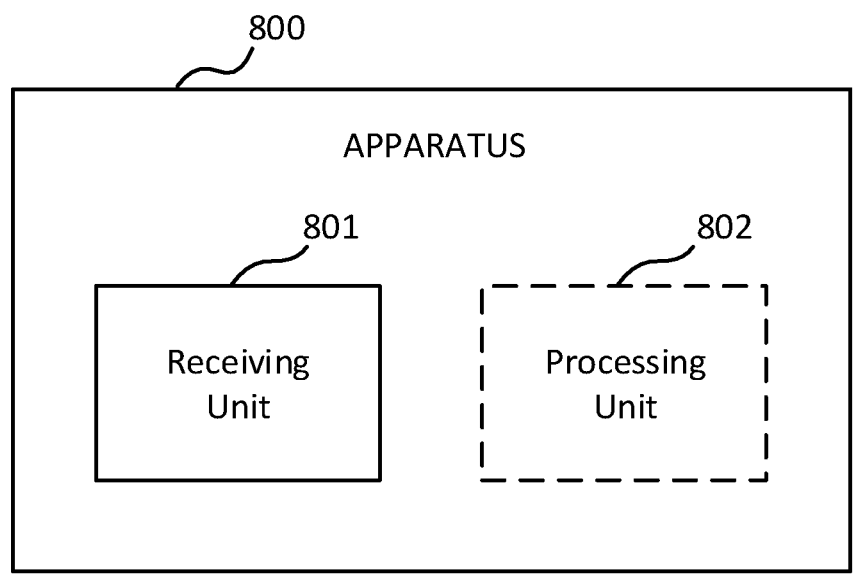
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a receiving unit 801 and optionally a processing unit 802. In an exemplary embodiment, the apparatus 800 may be implemented in a terminal device such as the terminal device as describe with respect to FIG. 3. The receiving unit 801 may be operable to carry out the operation in block 302, and the processing unit 802 may be operable to carry out the operation in block 304. In another exemplary embodiment, the apparatus 800 may be implemented in a network node such as the network node as describe with respect to FIG. 5. The receiving unit 801 may be operable to carry out the operation in block 502, and the processing unit 802 may be operable to carry out the operation in block 504. Optionally, the receiving unit 801 and/or the processing unit 802 may be operable to carry out more or less operations to implement the proposed methods according to the exemplary embodiments of the present disclosure.

Figure 9:
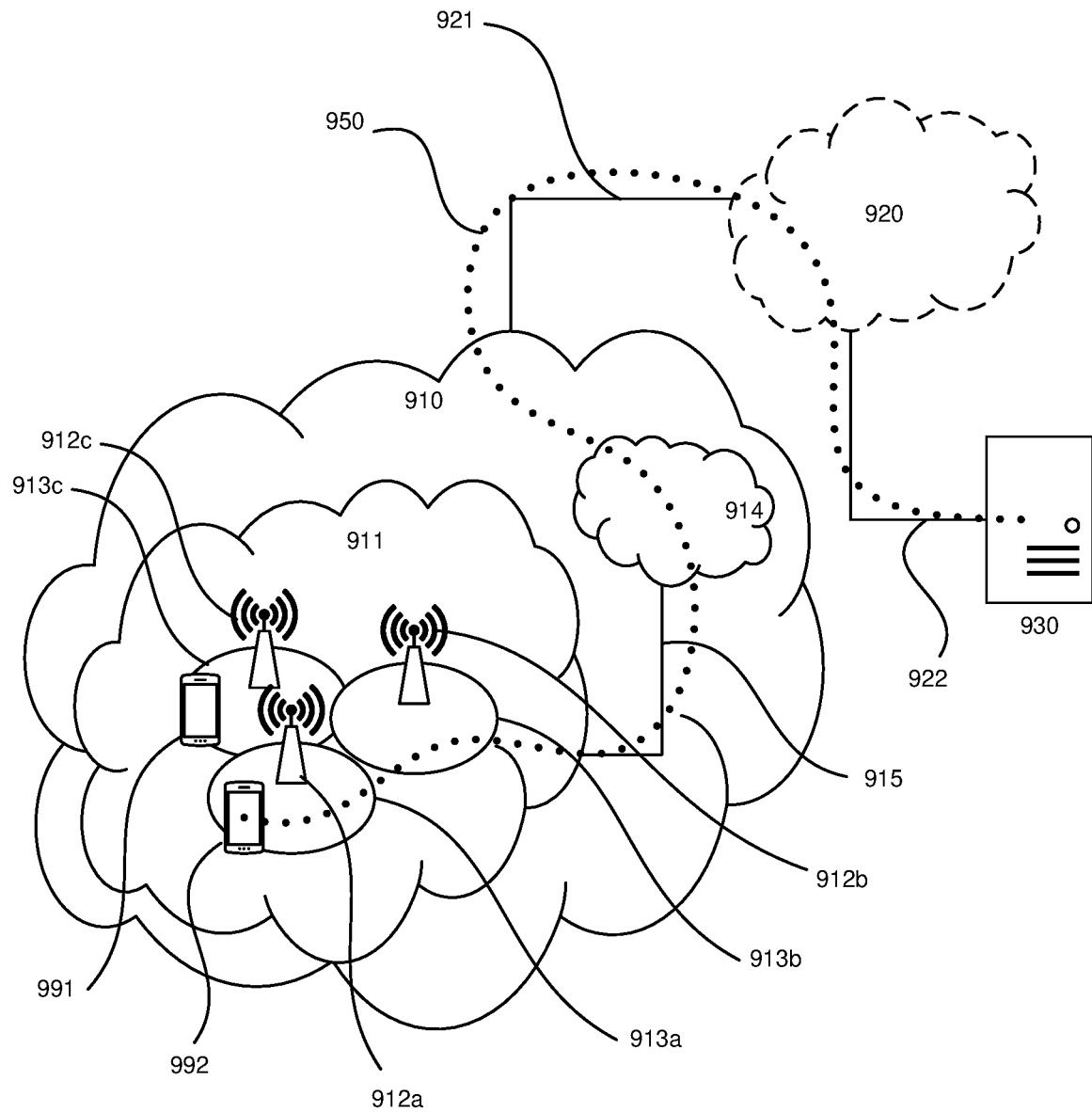
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
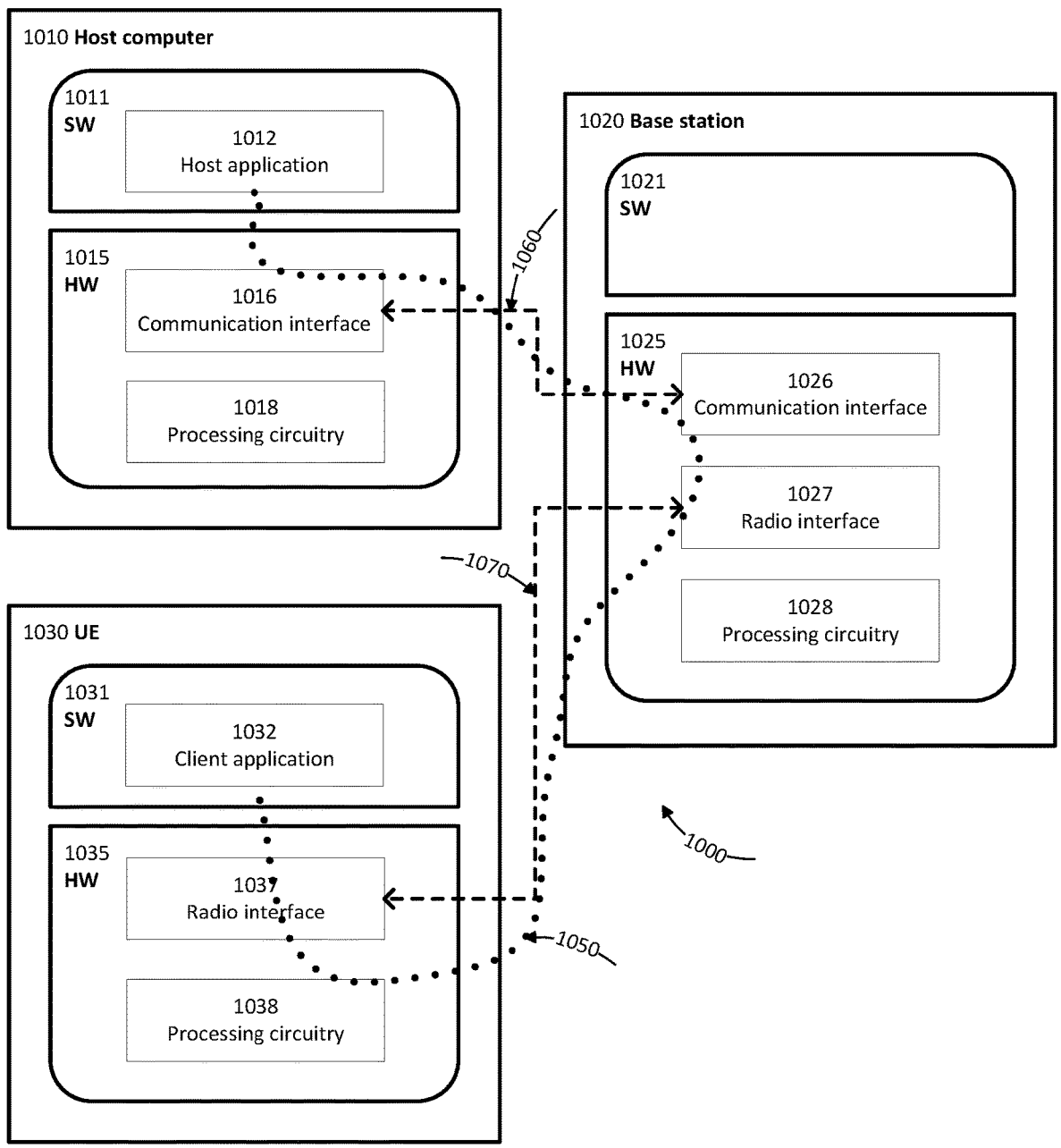
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
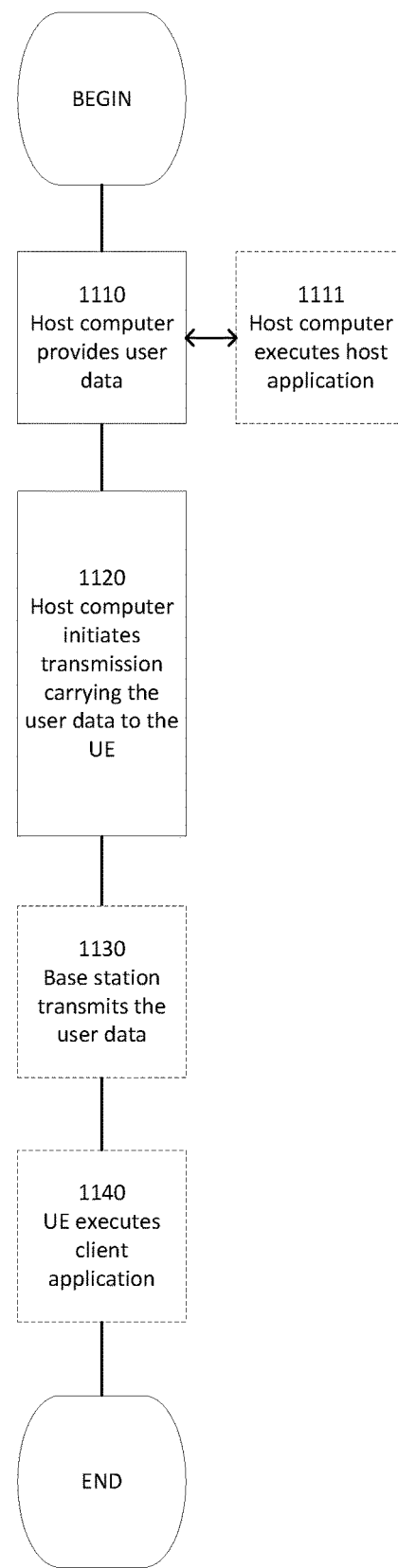
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
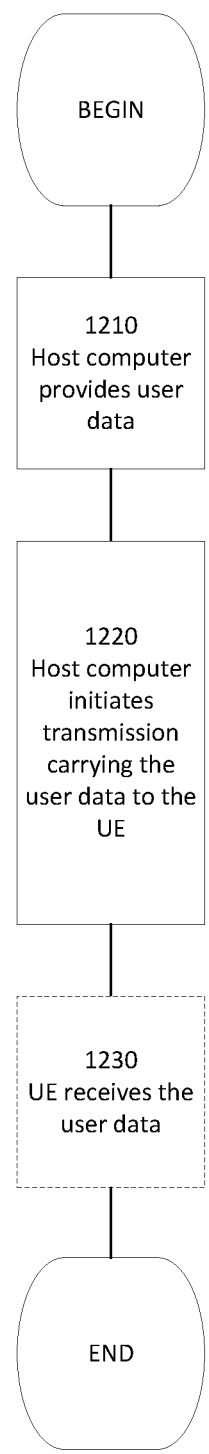
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
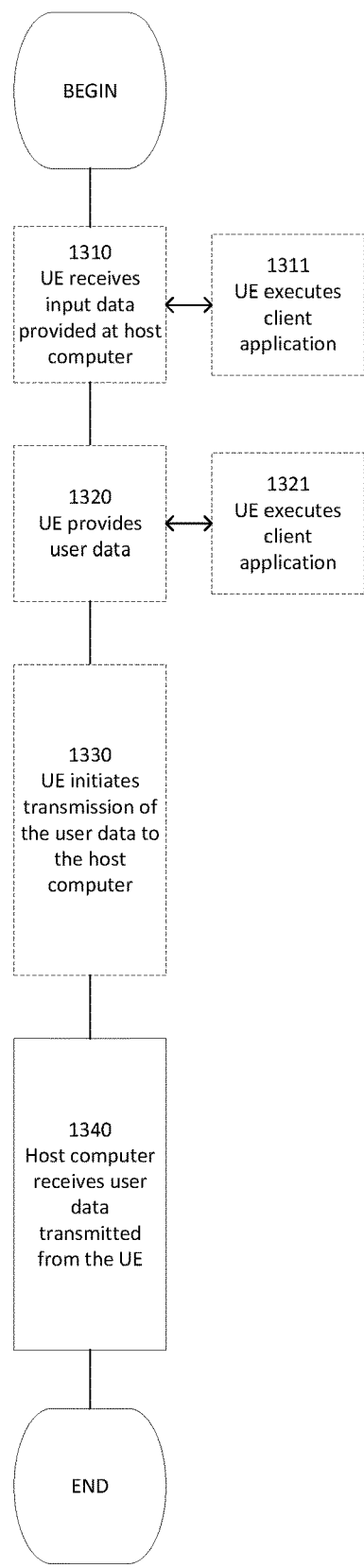
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
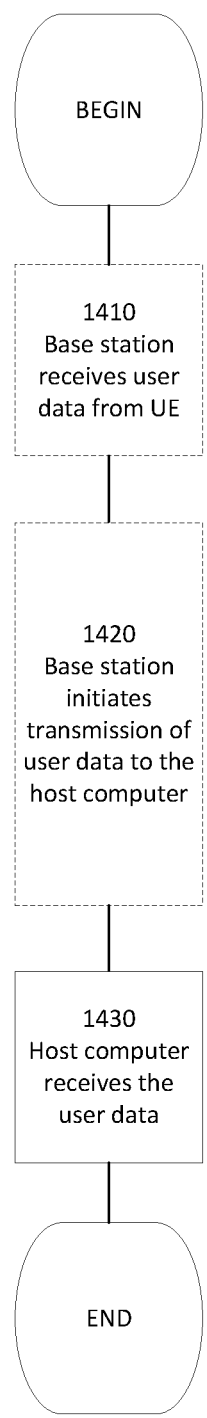
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
receiving, from a network node, signaling information indicating an adjustment amount of a parameter for a transmission from the terminal device to the network node, wherein the transmission is based at least in part on a semi-static scheduling configuration for the terminal device by the network node.

2. The method of claim 1, wherein the indication of the adjustment amount of the parameter by the signaling information enables the terminal device to adjust at least one of:
the parameter corresponding to the adjustment amount; and
one or more other parameters for the transmission from the terminal device to the network node.

3. The method of claim 2, wherein the adjustment to the one or more other parameters are based at least in part on the adjustment to the parameter.

4. The method of claim 1, wherein the adjustment amount of the parameter is determined per cell, per carrier, per bandwidth part, per sub-band, per channel, per terminal device, or per semi-static scheduling configuration; and/or
wherein the adjustment amount of the parameter is applicable to one or more semi-static scheduling configurations.

5. The method of claim 4, wherein the signaling information indicates the one or more semi-static scheduling configurations by at least one of:
a bitmap;
an index; and
an identifier of a hybrid automatic repeat request process.

6. The method of claim 1, further comprising:
receiving first downlink feedback information from the network node, wherein the first downlink feedback information indicates to the terminal device how to process second downlink feedback information from the network node, and wherein the signaling information is carried in the second downlink feedback information.

7. The method of claim 6, wherein the second downlink feedback information is sharable by the terminal device with one or more other terminal devices.

8. The method of claim 1, wherein the signaling information indicates a time at which the adjustment amount of the parameter is to be applied by the terminal device.

9. The method of claim 1, further comprising:
transmitting a control element for medium access control to the network node to confirm reception of the signaling information by the terminal device, wherein the control element for medium access control indicates at least one of a semi-static scheduling configuration, a cell, a carrier, a bandwidth part, a sub-band and a channel, to confirm reception of the associated adjustment amount of the parameter by the terminal device.

10. The method of claim 9, wherein the transmission from the terminal device to the network node is for uplink traffic of the terminal device, and wherein no transmission for the uplink traffic has been scheduled to the network node prior to the transmission of the control element for medium access control to the network node.

11. A method performed by a network node, comprising:
determining an adjustment amount of a parameter for a transmission from a terminal device to the network node, wherein the transmission is based at least in part on a semi-static scheduling configuration for the terminal device by the network node; and
transmitting signaling information to the terminal device to indicate the adjustment amount of the parameter.

12. The method of claim 11, wherein the indication of the adjustment amount of the parameter by the signaling information enables the terminal device to adjust at least one of:
the parameter corresponding to the adjustment amount; and
one or more other parameters for the transmission from the terminal device to the network node.

13. The method of claim 12, wherein the adjustment to the one or more other parameters are based at least in part on the adjustment to the parameter.

14. The method of claim 11, wherein the adjustment amount of the parameter is determined per cell, per carrier, per bandwidth part, per sub-band, per channel, per terminal device, or per semi-static scheduling configuration.

15. The method of claim 11, wherein the adjustment amount of the parameter is applicable to one or more semi-static scheduling configurations.

16. The method of claim 11, further comprising:
transmitting first downlink feedback information to the terminal device, wherein the first downlink feedback information indicates to the terminal device how to process second downlink feedback information from the network node, and wherein the signaling information is carried in the second downlink feedback information.

17. The method of claim 11, wherein the signaling information indicates a time at which the adjustment amount of the parameter is to be applied by the terminal device.

18. The method of claim 11, further comprising:
receiving a control element for medium access control from the terminal device to confirm reception of the signaling information by the terminal device, wherein the control element for medium access control indicates at least one of a semi-static scheduling configuration, a cell, a carrier, a bandwidth part, a sub-band and a channel, to confirm reception of the associated adjustment amount of the parameter by the terminal device.

19. The method of claim 18, wherein the transmission from the terminal device to the network node is for uplink traffic of the terminal device, and wherein no transmission for the uplink traffic has been scheduled to the network node prior to the reception of the control element for medium access control by the network node.

20. A terminal device, comprising:
one or more processors; and
one or more memories comprising computer program codes, the one or more memories and the computer program codes configured to, with the one or more processors, cause the terminal device at least to:
receive, from a network node, signaling information indicating an adjustment amount of a parameter for a transmission from the terminal device to the network node, wherein the transmission is based at least in part on a semi-static scheduling configuration for the terminal device by the network node.

* * * * *